United States Patent [19]

Mykkanen et al.

[11] Patent Number: 6,008,979
[45] Date of Patent: *Dec. 28, 1999

[54] ELECTRICAL GROUNDING SYSTEM FOR INSTRUMENTS USED IN ASSEMBLING DISC DRIVES

[75] Inventors: C. Fred Mykkanen, Fridley; S. Ross Ambrose, Bloomington, both of Minn.

[73] Assignee: Seagate Technology, Inc., Scotts Valley, Calif.

[ * ] Notice: This patent is subject to a terminal disclaimer.

[21] Appl. No.: 08/945,278

[22] PCT Filed: May 14, 1996

[86] PCT No.: PCT/US96/06854

§ 371 Date: Oct. 16, 1997

§ 102(e) Date: Oct. 16, 1997

[87] PCT Pub. No.: WO96/36963

PCT Pub. Date: Nov. 21, 1996

Related U.S. Application Data

[63] Continuation of application No. 08/445,183, May 19, 1995, abandoned.

[51] Int. Cl.⁶ .................................................... G11B 5/48
[52] U.S. Cl. ............................................ 361/220; 361/212
[58] Field of Search .................................. 361/212, 215, 361/220–224

[56] References Cited

U.S. PATENT DOCUMENTS

| | | | |
|---|---|---|---|
| 1,940,491 | 12/1933 | Freitag | 175/265 |
| 4,373,175 | 2/1983 | Mykkanen | 361/220 |
| 4,873,608 | 10/1989 | Yoshimura | 361/220 |
| 4,935,308 | 6/1990 | Guerra et al. | 428/518 |
| 5,215,608 | 6/1993 | Stroud et al. | 156/64 |
| 5,855,301 | 1/1999 | Mykkanen et al. | 361/215 |

FOREIGN PATENT DOCUMENTS

| | | |
|---|---|---|
| 0 474 399 | 3/1992 | European Pat. Off. . |
| 2 646 491 | 11/1990 | France . |

OTHER PUBLICATIONS

IBM Technical Disclosure Bulletin, "Hand Tools Grounding for Manufacturing Sensitive Parts Assemblies", Feb. 1994, vol. 37, No. 2A, pp. 231–232.

IBM Technical Disclosure Bulletin, "Read/Write Magnetic Recording Head With Static Bleedoff", Feb. 1985, vol. 27, No. 9, pp. 5352–5353.

*Primary Examiner*—Fritz Fleming
*Attorney, Agent, or Firm*—Kinney & Lange

[57] ABSTRACT

An instrument (12) separated from ground by a supradissipative resistance and having a surface (26) which is placed in electrical contact with a magnetic head of a disc drive assembly includes an electrically conductive receptacle (134) engaging and electrically connected proximate to the surface (26) of the instrument (12). The electrically conductive receptacle (134) is electrically coupled to ground for grounding the instrument (12) to prevent damage to the magnetic head caused by static discharge from the instrument (12).

27 Claims, 3 Drawing Sheets

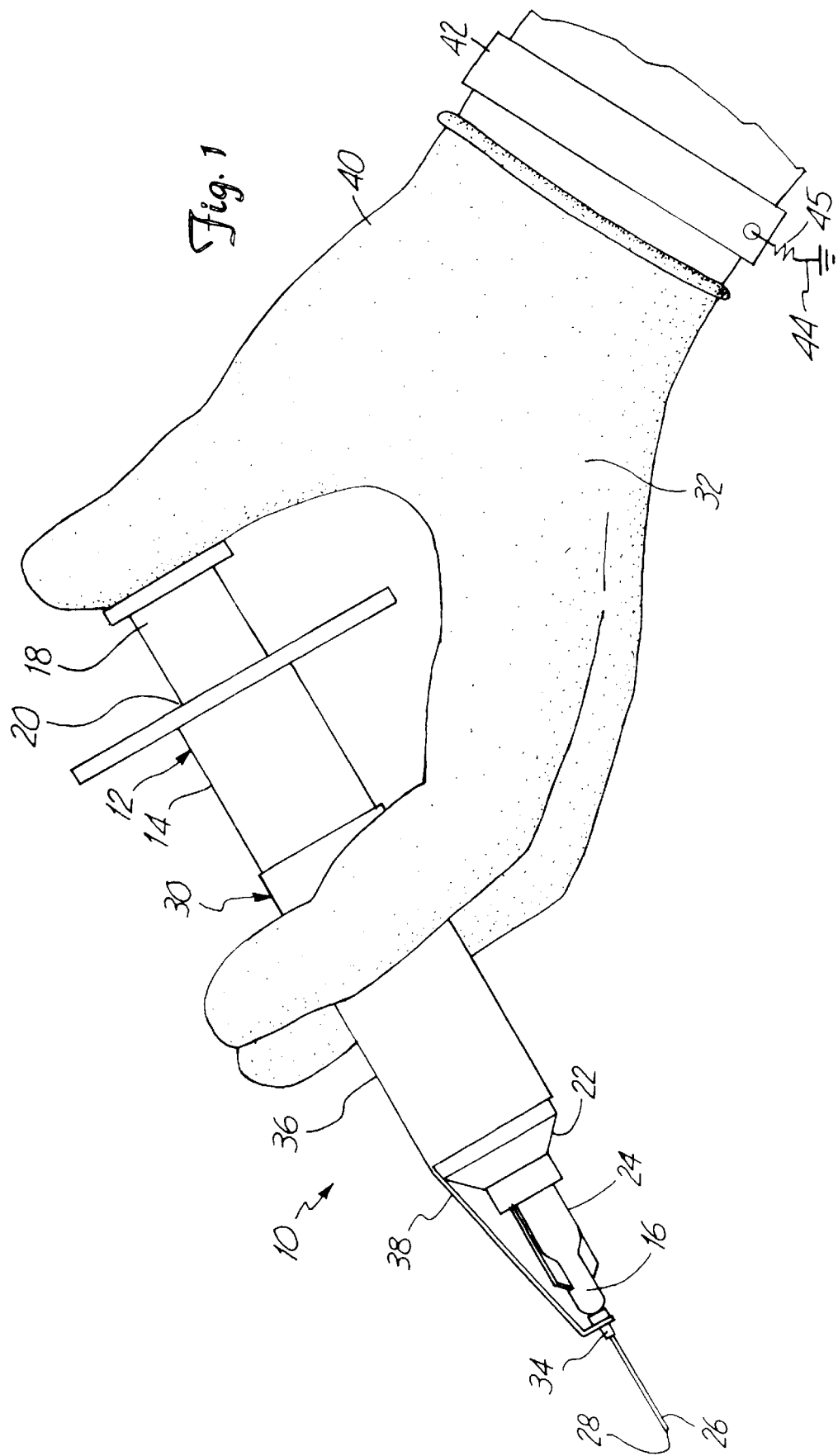

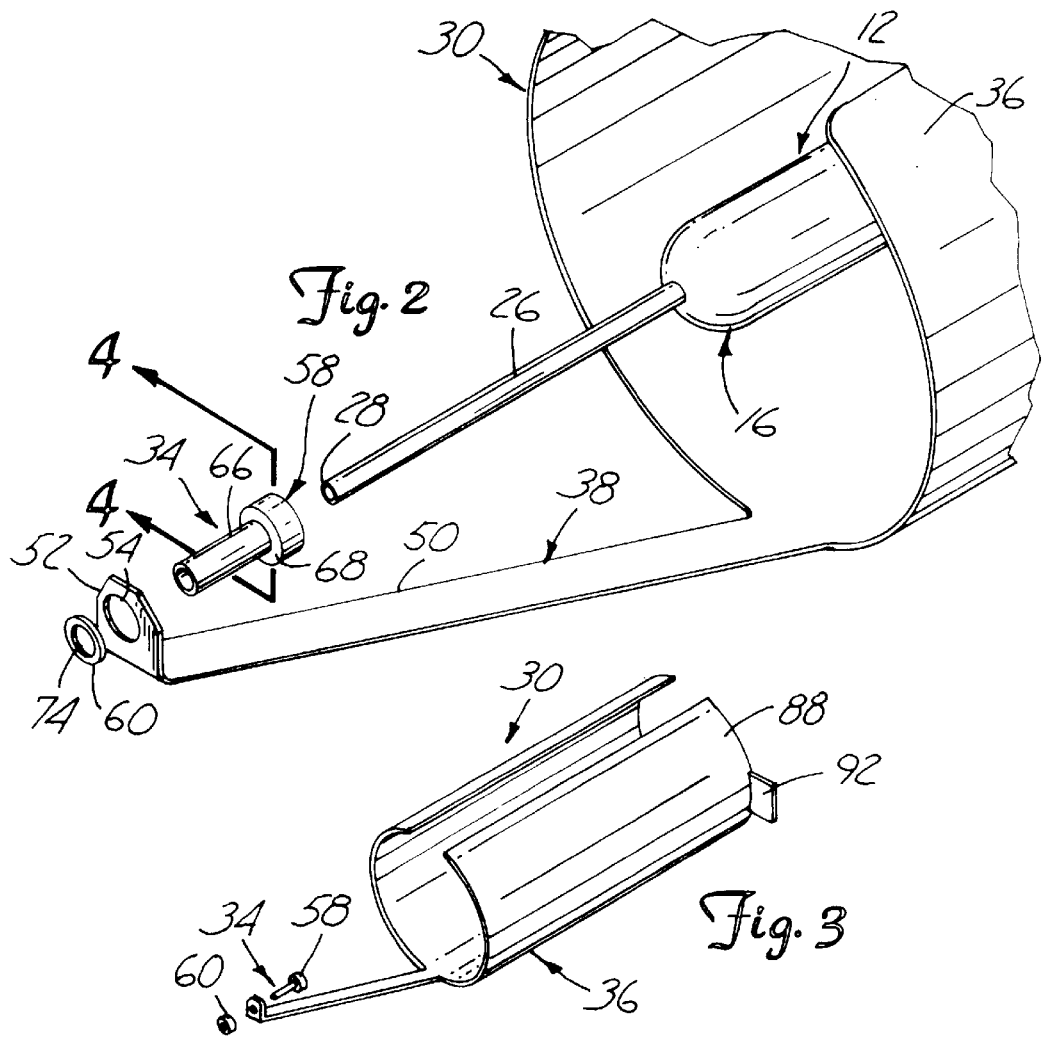
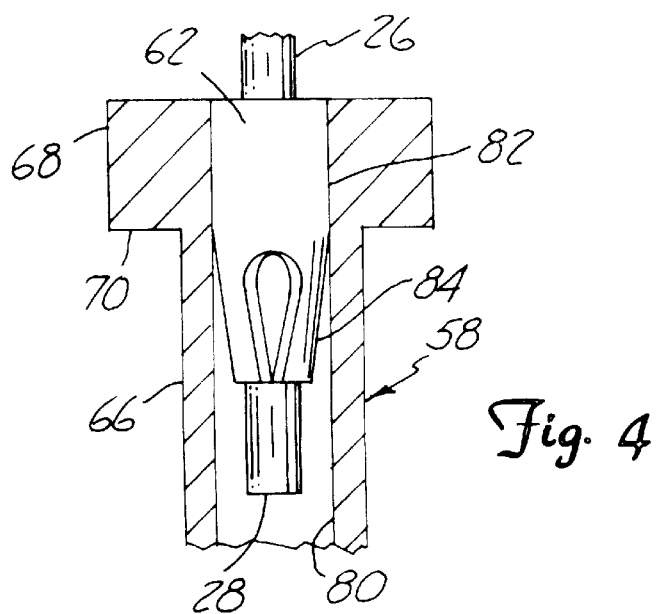

ELECTRICAL GROUNDING SYSTEM FOR INSTRUMENTS USED IN ASSEMBLING DISC DRIVES

CROSS REFERENCE TO RELATED APPLICATIONS

This application is a continuation of application Ser. No. 08/445,183 filed May 19, 1995, now abandoned.

This application is a §371 filing of PCT Application No. PCT/US/06854 filed May 14, 1996, which claims priority of application Ser. No. 08/445,183 filed May 19, 1995.

This application is related to application Ser. No. 08/723, 261 filed Sep. 30, 1996, which claims priority of application Ser. No. 08/445,183 filed May 19, 1995.

BACKGROUND OF THE INVENTION

The present invention relates to devices and instruments for use in assembling a disc drive assembly and its sub-assemblies. In particular, the present invention relates to an electrical grounding device electrically coupled to a dispenser for dispensing fluids, such as glue and epoxy, upon a surface of the disc drive assembly which is in electrical contact with a magnetic head of the assembly.

The magnetic head stores and retrieves information on a magnetic disc. Several types of magnetic heads are currently in use, including metal-in-gap (MIG) heads, thin film (TF) heads and magnetoresistive (MR) heads. Due to the continual drive to increase storage density in magnetic disc drive units, magnetic heads have become increasingly advanced and sensitive.

Typically, a magnetic head consists of a slider and a transducer. The slider carries the transducer and flies over the surface of the magnetic disc as the disc rotates. The transducer reads and/or writes to the magnetic disc. Electric signals are provided to and received from the transducer via conductors which are typically twisted wires. A glue, such as fluid epoxy, attaches wires or tacks the wires to bonding pads and sides of the slider. This tacking process, otherwise known as conformal coating, actually coats the wire where the wire is attached to the slider. As a result, the conformal coating process prevents the wires from being pulled loose and also protects the wires from corrosion.

The slider of the magnetic head is supported above the magnetic disc as part of a head/gimbal assembly. As described in Hagen U.S. Pat. No. 5,027,239, herein incorporated by reference, the head-gimbal assembly typically includes at least one support arm, a load beam, a gimbal and the magnetic head discussed above. The support arm is attached to the load beam by a well-known technique referred to as swaging or ball staking. The load arm carries the load beam. The load beam is attached, preferably by laser welding, to the gimbal. Lastly, the gimbal is preferably glued to the slider of the magnetic head by fluid epoxy or other conventional adhesive materials. Typically, the fluid, such as glue or fluid epoxy, applied to surfaces of the slider and the gimbal is dispensed onto the surface from a dispensing syringe which is positioned and controlled either manually or by an automated process.

IBM TDB vol. 37, no. 2A, February 1994, entitled "Hand tools grounding for manufacturing sensitive parts assemblies" discloses a kit for fitting to an existing small hand tool such as a commercial screwdriver with a plastic handle, the kit comprising a number of fingers extending from a central aperture through which the end of the tool is inserted. The fingers are stuck to the handle of the tool and comprise electrostatic discharge material for preventing static build-up at the end of the tool.

FR-A-2646491 discloses a suction tube for grasping and transporting semiconductor devices having a conductive insert for making an electrical connection between the end of the tool contacting the semiconductor devices and a carbon fibre body of the tool, such as to conduct away from the tool end electrostatic charge.

Neither of these disclosures are concerned with a dispenser for dispensing fluid to surfaces of a disk drive assembly. Such dispensers frequently suffer from a problem of electrostatic charge build-up at the surface of the dispenser close to the disk drive assembly.

SUMMARY OF THE INVENTION

It is an object of the present invention to provide an assembly for coupling to a dispenser for preventing the build-up of electrostatic charge.

In accordance with a first aspect of the invention, there is provided a surface for assembling a disc drive assembly, wherein the syringe is separated from ground by a supradissipative resistance and wherein the syringe has a needle which is placed in electrical contact with a surface of the assembly in electrical contact with magnetic head of the assembly, characterized by:

an electrically conductive receptacle engaging and electrically connected to the needle; and electrically conductive means electrically connected between the conductive receptacle and ground, for grounding the syringe to prevent damage to the magnetic head caused by static discharge from the syringe.

In a further aspect, the invention provides a method for electrically grounding a hand-held syringe used for assembling a disc drive assembly, wherein the syringe has a needle which is placed in electrical contact with a magnetic head of the disc drive assembly, the method comprising:

mounting an electrically conductive attachment on the syringe, the attachment having an electrically conductive receptacle in electrical contact with the needle and an electrically conductive means in electrical contact with the conductive receptacle, the conductive means having a configuration for being grasped by the hand of an operator;

wearing an electrically conductive glove over the hand;

wearing an electrically conductive wrist strap, wherein the wrist strap is in contact with the skin of the operator and is electrically grounded; and grasping the electrically conductive means with the electrically conductive glove when the needle is positioned in electrical contact with the magnetic head.

The present invention is an electrical grounding system for devices or instruments used for assembling portions of a disc drive assembly which are in electrical contact with a magnetic head of the assembly. The present invention includes conductive means electrically connected proximate to a surface of a device which is placed in contact with the surface of the assembly in electrical contact with the magnetic head of the assembly. The conductive means are electrically grounded to drain static charge build-up from the device to prevent damage to the magnetic head caused by static discharge from the device.

The grounding system illustrated is for use with a dispenser having an opening through which fluids, such as coatings, glue and epoxy, are dispensed onto the surface of the disc drive assembly or its sub-assemblies. The illustrated grounding system includes an electrically conductive receptacle electrically connected adjacent to the opening of the dispenser for electrically grounding the surface of the dispenser most likely to come into electrical contact with the magnetic head of the assembly. The electrically conductive receptacle is grounded to drain static charge build-up from the dispenser.

BRIEF DESCRIPTION OF THE DRAWINGS

FIG. 1 is a perspective view of an electrical grounding system including a grounding attachment coupled to a dispenser.

FIG. 2 is an enlarged fragmentary exploded view of the dispenser and the grounding attachment of FIG. 1.

FIG. 3 is an exploded perspective view of the grounding attachment of FIG. 1.

FIG. 4 is a cross-sectional view of a receptacle of the grounding attachment with the dispenser partially disposed within the receptacle.

DETAILED DESCRIPTION OF THE PREFERRED EMBODIMENTS

Figure 5:
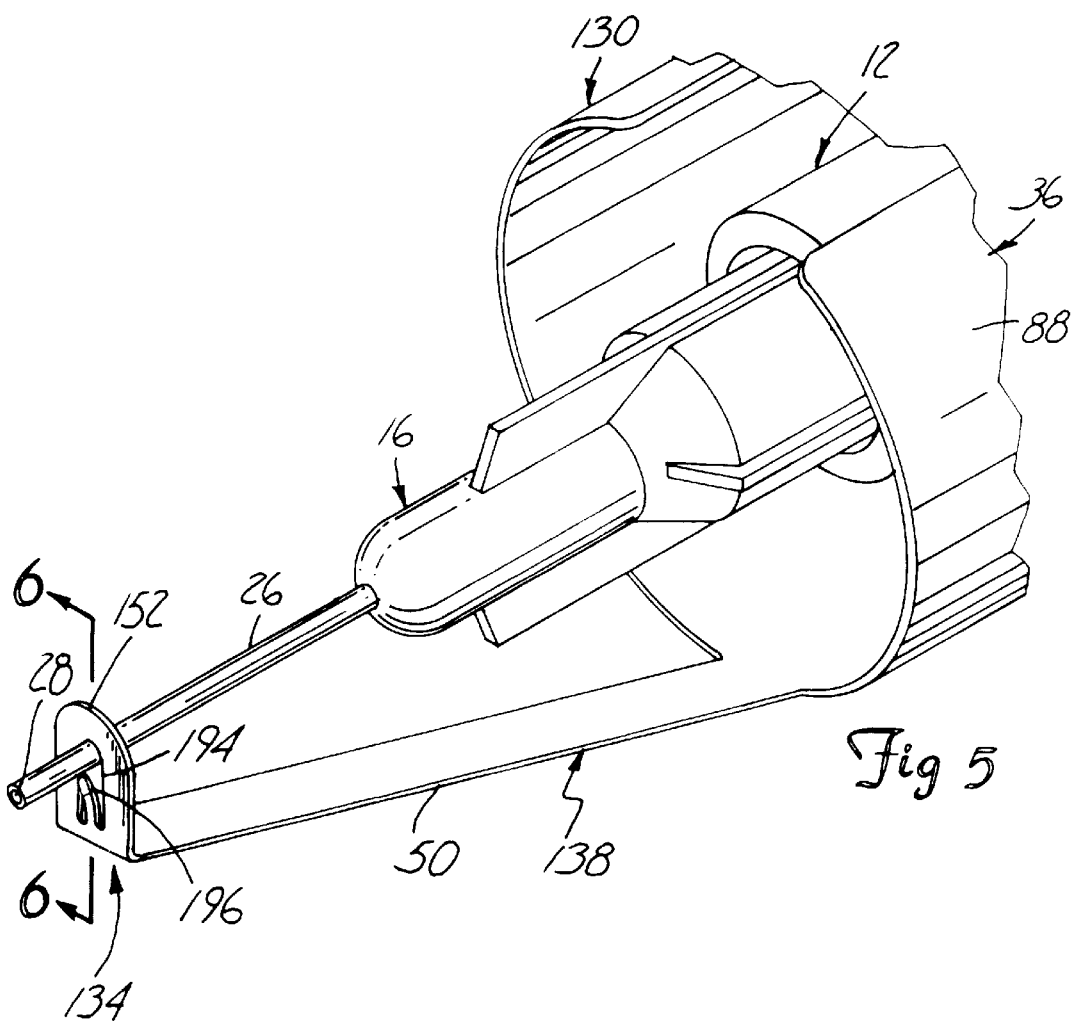
FIG. 5 is an enlarged fragmentary exploded view of an alternate embodiment of the grounding attachment and the receptacle.

FIG. 1 illustrates a device or instrument for use in assembling a disc drive assembly or its sub-assemblies. In particular, FIG. 1 illustrates an electrical grounding system 10 electrically coupled to dispenser 12. Dispenser 12 is an example of an instrument used for assembling a disc drive assembly. In particular, dispenser 12 meters and dispenses exact amounts of glue or coatings, such as fluid epoxy, to surfaces of the magnetic head, including the slider and the transducer, and the gimbal (not shown) to attach the slider to the gimbal and to apply a conformal coating over wires coupled to the transducer and the slider of the magnetic head. The conformal coating provides the wire with strain release and prevents the wires from being pulled loose. The conformal coating applied to the wires also prevents corrosion of the wires. Dispenser 12 preferably comprises a syringe supplied by E.F.D. Incorporated, 977 Waterman Avenue. East Providence. R.I. 02914.

Dispenser 12 generally includes barrel 14, dispensing tip 16, and piston 18. Because dispenser 12 is used for assembling disc drives or their sub-assemblies, each component of dispenser 12 is preferably non-magnetic and contaminant free (i.e. excluding such elements as carbon and silicone). Barrel 14 is generally cylindrical or tubular in shape and includes a first open end 20 and a second narrowing end 22 opposite the first end. Barrel 14 acts as a reservoir and contains the fluid epoxy of dispenser 12. Barrel 14 is preferably transparent to permit amounts of fluid within barrel 14 to be visually detected. Barrel 14 may have various diameters and may contain various amounts of fluid epoxy. In the example illustrated in FIG. 1, barrel 14 and the remaining components of dispenser 12 are sized and configured for manual dispensing of epoxy from dispenser 12. As can be appreciated, barrel 14 and dispenser 12 have any one of various sizes when fluid epoxy is dispensed by an automated process (not illustrated). Barrel 14 is preferably formed from silicon free polypropylene to prevent contamination of the disc drive.

Dispensing tip 16 is sealedly coupled to second narrowing end 22 of barrel 14. Dispensing tip 16 includes hub 24 and tube or needle 26. Hub 24 is fixedly secured about needle 26 and is configured for coupling to second narrowing end 22 of barrel 14. Preferably, hub 24 includes exterior threads for threadably engaging exterior threads defined by end 22 of hub 24. As a result, dispensing tip 16 may be easily replaced. Alternatively, hub 24 of dispensing tip 16 is integrally formed as part of barrel 14. Hub 24 is preferably formed from a silicon free homopolymer polypropylene with an ultra-violet block additive. The ultra-violet block additive is preferably colored to indicate a diameter of the opening defined by dispensing tip 16 through which fluid epoxy is dispensed.

Needle 26 is a tube having a highly controlled inner diameter for dispensing exact amounts of glue or epoxy. Needle 26 has an opening 28 at one end thereof through which the fluid is dispensed. Although shown as having a uniform outer diameter and as having an opening at the distal end, needle 26 may alternatively have a narrowing outer diameter and an opening through a sidewall of the tube. For contamination concerns, needle 26 is preferably formed from 304 stainless steel-passivated. Alternatively, needle 26 may be formed of any one of a variety of conductive materials. For purposes of this disclosure, the term "conductive," hereinafter refers to any material that has an electrical resistance from zero ohms to about $1.0 \times 10^{11}$ ohms. Needle 26 and hub 24 define a highly controlled fluid conduit through which fluid epoxy from within barrel 14 is emitted out opening 28 by actuation of piston 18.

Piston 18 is conventionally known and includes a bulb (not shown) for insertion into barrel 14. Actuation of piston 18 causes epoxy within barrel 14 to be dispensed out opening 28 of needle 26 onto a surface of the magnetic head or the gimbal. For illustration purposes, FIG. 1 shows piston 18 as being manually actuated. However, piston 18 may alternatively be automatically operated by an automated process as is conventionally known. Furthermore, for more precise control of fluid dispensing, an air operated dispensing system, a timed-pulse air operated dispensing system, or other conventionally known means may be used in place of piston 18 for forcing fluid out needle 26 of dispenser 12.

Because dispenser 12 applies fluid epoxy to extremely small and precise locations or surfaces of the magnetic head or gimbal, the needle of dispenser 12 is often brought into very close or even physical contact with the surface upon which the epoxy is being deposited. It has been discovered that because components of dispenser 12 are electrically separated from ground by a supradissipative resistance (i.e. a resistance greater than about $1.0 \times 10^{11}$ ohms), electrostatic charge builds up within the material of dispenser 12. As a result, the electrostatic charge at needle 26 is or may be discharged when needle 26 is positioned in close or physical contact with a surface upon which epoxy is being deposited. Because the surfaces upon which the fluid epoxy are deposited are electrically connected or coupled to the magnetic head, the electrostatic discharge from needle 26 is also conducted to the magnetic head by direct electrical continuity or dielectric breakdown. It has been discovered that this electrostatic discharge to the magnetic head may actually cause damage to advanced magnetic heads which are extremely sensitive to even extremely low voltages. As a result, based upon this discovery, grounding system 10 is provided for electrically grounding needle 26 to ensure that needle 26 and the surface upon which epoxy is being deposited are at an equal or near equal electrical potential.

Grounding system 10 electrically grounds conductive needle 26 of dispenser 12 and permits static charge to be drained from needle 26. Grounding system 10 includes grounding attachment 30 and grounding connection 32. Because grounding system 10 is used for grounding instruments used in assembling disc drives or their sub-assemblies, each component of grounding system 10 is preferably non-magnetic and contaminant free (i.e. excluding such elements as carbon and silicone). Grounding attachment 30 mounts upon dispenser 12 and generally includes receptacle 34, conductive mounting member 36 and conductive arm 38. Receptacle 34 is made of a highly electrically conductive material and receives or holds needle 26 of dispenser 12. Because needle 26 is preferably made of stainless steel, which is electrically conductive, receptacle 34 is electrically connected adjacent to or proximate a surface of needle 26 most likely to come into close or actual physical contact with a surface of the magnetic head or gimbal. This surface on dispenser 12 is the surface of needle 26 adjacent opening 28 through which fluid epoxy is dispensed. Receptacle 34 is grounded through arm 38, mounting member 36 and ground connection 32. Preferably, receptacle 34 is grounded to an AC ground. As a result, receptacle 34 electrically grounds the surface of dispenser 12 most likely to come into contact with the surface of the disc drive assembly that is electrically coupled to the sensitive magnetic head. Consequently, receptacle 34 prevents damage to the magnetic head caused by electrostatic discharge from needle 26 of dispenser 12.

Mounting member 36 is configured for attachment to barrel 14 of dispenser 12 and is made of a highly electrically conductive material. Mounting member 36 is preferably made of resilient spring stainless steel. Mounting member 36 is preferably configured for being releasably mounted to barrel 14 so that grounding attachment 30 may be removed from dispenser 12 when barrel 14 is being refilled with fluid epoxy or when dispensing tip 16 is being replaced. Alternatively, mounting member 36 may be fixedly secured to barrel 14. Mounting member 36 is electrically grounded by ground connection 32. As a result, mounting member 36 grounds and drains static charge build-up from barrel 14 of dispenser 12. As shown by FIG. 1, mounting member 36 is preferably configured for being grasped by an operator's hand. Alternatively, when a machine or other automated process automatically dispenses fluid epoxy from dispenser 12, mounting member 36 may have any one of a variety of shapes.

Conductive arm 38 extends from mounting member 36 to receptacle 34 and is made of a highly electrically conductive material. Conductive arm 38 is preferably made from spring stainless steel. Conductive arm 38 establishes an electrical conductive path from receptacle 34 to mounting member 36 and ultimately to ground through ground connection 32.

Ground connection 32 electrically grounds grounding attachment 30 and includes conductive glove 40, wrist strap 42 and electrical conductor 44. Conductive glove 40 is an electrically conductive glove sized for fitting upon an operator's hand. Preferably, glove 40 is made from a synthetic rubber possessing conductive properties such as Nitrilite supplied by Ansell-Edmont Industrial Inc., 1300 Walnut Street, Box 6000, Coshocton. Ohio 43812-6000. Glove 40 prevents contaminating particles and oils from the operator's hand from being deposited upon components of the disc drive assembly. Because conductive glove 40 is made of an electrically conductive material, glove 40 conducts static charge build-up from grounding attachment 30 and needle 26 to tissue of the operator when glove 40 is placed in contact with attachment 30. Glove 40 conducts the static charge away from grounding attachment 30 through the tissue of the operator to wrist strap 42 which is electrically connected to ground. As a result, glove 40 is electrically grounded via wrist strap 42. Alternatively, glove 40 may be formed from a material such that electrical charges may be conducted across and along the surface of the glove itself so that the glove may be directly electrically grounded by any conventional grounding connections.

Wrist strap 42 preferably encircles the operator's wrist and is electrically connected to conductive glove 40. Wrist strap 42 is formed from a highly electrically conductive material. An example of such a wrist strap is disclosed in Mykkanen, U.S. Pat. No. 4,373,175. Preferably, wrist strap 42 is a metal stretch band or woven wire band in direct electrical contact with the skin of the operator. As a result, an electrical pathway is formed from glove 40 through the tissue of the operator to wrist strap 42. Wrist strap 42 is electrically coupled to conductor 44. Conductor 44 is electrically connected to AC ground. For safety reasons, a 250 to 10 megohm resistor 45 is inserted in series with conductor 44. However, because the total resistance in series remains below $1.0 \times 10^{11}$ ohms, grounding of electrostatic charge is not negated. As a result, conductive glove 40, wrist strap 42 and conductor 44 of ground connection 32 provide a reliable electrical grounding connection to grounding attachment 30 and needle 26 of dispenser 12 during manual dispensing of fluid epoxy from dispenser 12.

Overall, grounding attachment 30, conductive glove 40, wrist strap 42 and conductor 44 form an electrical pathway from needle 26 to ground for draining static charge. The electrical pathway formed by grounding attachment 30, glove 40, the tissue of the operator, wrist 42 and conductor 44 has a maximum total resistance in series of about $1.0 \times 10^{11}$ ohms. Preferably, the electrical pathway has as low of an electrical resistance as possible between needle 26 and ground. Because the electrical pathway has a resistance in series at least within the dissipative range of resistance, grounding system 10 effectively drains static charge from needle 26 of dispenser 12 and limits the amount of voltage existing at the tip of needle 26. In addition, grounding system 10 provides a grounding connection that is reliable, ergonomic and contaminant free.

As discussed above, fluid epoxy may alternatively be automatically dispensed from dispenser 12 by an automated process. As a result, conductive glove 40 and wrist strap 42 of ground connection 32 may be omitted and conductor 44 may be directly electrically coupled to grounding attachment 30. In particular, conductor 44 may be directly electrically attached to mounting member 36 of attachment 30. Furthermore, when fluid epoxy is automatically dispensed from dispenser 12, grounding attachment 30 may simply comprise receptacle 34, whereby conductor 44 is directly electrically connected to receptacle 34. As can now be appreciated, electrical grounding system 10 may have a variety of designs and configurations for electrically grounding and draining static charge build-up from instruments, such as dispenser 12 having needle 26, used for assembling disc drives and their sub-assemblies.

FIGS. 2–4 illustrate grounding attachment 30 in greater detail. FIG. 2 is an enlarged fragmentary exploded view of grounding attachment 30 partially removed from dispenser 12. FIG. 3 is an exploded perspective view of grounding attachment 30 completely removed from dispenser 12. FIG. 4 is a cross-sectional view of needle 26 partially inserted through receptacle 34. FIG. 2 illustrates receptacle 34 and conductive arm 38 in greater detail. As best shown by FIG. 2, conductive arm 38 includes band 50 and receptacle mount 52. Band 50 is made of a highly electrically conductive material and extends between mounting member 36 and receptacle mount 52. Preferably, band 50 is integrally formed with mounting member 36 and receptacle mount 52. Band 50 extends inward from mounting member 36 towards an axial center line of needle 26 and dispenser 12. As can be appreciated, band 50 and conductive arm 38 may alternatively be fixedly mounted to mounting member 36 at a desired angle with respect to mounting member 36. Band 50 is preferably formed from a rigid, yet resilient, material such as spring stainless steel. Because band 50 is preferably formed from a rigid, yet resilient conductive material, band 50 maintains receptacle mount 52 and receptacle 34 at a substantially fixed position relative to mounting member 36. Because band 50 maintains receptacle mount 52 and receptacle 34 at a substantially fixed position relative to mounting member 36, receptacle 34 is repositioned in substantial alignment with needle 26. As a result, grounding attachment 30 may be more easily mounted to dispenser 12. In addition, because band 50 extends inward towards the axial center line of needle 26 of dispenser 12, conductive arm 38 does not impair the vision of the operator when manually dispensing fluids from dispenser 12. Because band 50 is rigid, yet resilient, band 50 is durable as well. Consequently, band 50 enables grounding attachment 30 to be repeatedly removed from dispenser 12 when dispenser 12 is being refilled or when dispensing tip 16 is being replaced and also permits grounding attachment 32 to be remounted upon dispenser 12 for reuse. Alternatively, conductive arm may comprise any well known conducting structure such as a conductive wire.

Receptacle mount 52 is preferably formed by bending band 50 at an angle towards the axial center line of dispenser 12. Receptacle mount 52 is preferably formed from a highly electrically conductive material (preferably the same material as that of band 50) and defines aperture 54. Aperture 54 has a center in alignment with the axial center line of needle 20 of dispenser 12. Aperture 54 preferably has a diameter sized for the reception of receptacle 34 through which needle 26 extends.

As shown by FIGS. 2 and 4, receptacle 34 includes shell 58, capture washer 60 and contact 62 (shown only in FIG. 4). Shell 58 is a generally tubular shaped member made of a highly electrically conductive material such as a brass alloy. Shell 58 is preferably tin plated. Shell 58 has a first outer diameter 66 which widens to a second outer diameter 68 to form shoulder 70. Outer diameter 66 is sized for being received and extending through aperture 54 of receptacle mount 52. Shell 58 of receptacle 34 is preferably press fit in receptacle mount 52. However, outer diameter 68 is preferably sized larger than the diameter of aperture 54 so that shoulder 70 abuts receptacle mount 52.

Capture washer 60 is a conventional washer made of highly electrically conductive material, preferably tin plated brass, and defines an inner diameter 74. Inner diameter 74 is sized for receiving in close tolerance outer diameter 66 of shell 58. Because both capture washer 60 and receptacle shell 58 are preferably formed from tin plated brass, receptacle shell 58 and washer 60 are easily soldered together at low temperatures. As a result, capture washer 60 mounts receptacle shell 58 of receptacle 34 to receptacle mount 52 of conductive arm 38 without the high heat which would otherwise be required for silver soldering receptacle 34 directly to stainless steel mount 52. It has been discovered that the extreme heat required for silver soldering receptacle 34 to stainless steel mount 52 causes oxidation and annealing of contact 62 and reduces electrical conductivity. As a further assurance of electrical contact between receptacle 34 and receptacle mount 52, capture washer 60 and receptacle shell 58 are soldered to each other so that shoulder 70 of shell 58 and washer 60 are flush and in abutting contact with receptacle mount 52. Because washer 60 merely captures receptacle shell 58 to mount 52, shell 58 and washer 60 may be easily removed by reheating the solder and replaced if necessary, thereby extending the useful and reusable life of grounding attachment 30. In addition, receptacle 34 is securely held in place with respect to the axial center line of needle 26 and dispenser 12 for ease of mounting and removing grounding attachment 30 to and from needle 26 and dispenser 12.

As shown by FIG. 4, shell 58 further defines an inner diameter 80 sized for the reception of contact 62 and needle 26. Preferably, a surface of inner diameter 80 is tin plated nickel. Alternatively, the surface may comprise gold plated nickel. Contact 62 is formed from a highly electrically conductive resilient material such as a beryllium copper alloy. Preferably contact 62 has an outer diameter 82 sized so that contact 62 may be captivated within the inner diameter 80 of shell 58. The surface defining the outer diameter 82 is preferably tin plated nickel. Alternatively, the surface may be formed from gold plated nickel. As a result, contact 62 is securely electrically coupled to shell 58 to provide reliable electrical connection. Contact 62 defines an interior passage centrally extending through contact 62 and shell 58.

Contact 62 further includes a plurality of prongs or leaves 84. Leaves 84 integrally extend from an end of contact 62 into an interior of shell 58. Leaves 84 are angled towards an axial center line of contact 62. Leaves 84 are preferably formed from a resilient material having a memory such that upon insertion of needle 26 into the passage defined by contact 62, leaves 84 grasp needle 26 to axially center needle 26 and to insure a reliable electrical connection or continuity of contact between needle 26 and contact 62 without the need for soldering needle 26 to receptacle 34. Thus, leaves 84 allow needle 26 to be removed, enabling grounding attachment 30 to be reused.

Furthermore, because the force used to insert and remove needle 26 from contact 62 of receptacle 34 is distributed to each of the plurality of leaves, contact 62 is less likely to be damaged upon repeated insertion and removal of needle 26 into and out of receptacle 34. Because needle 26 is inserted concentrically through contact 62 and shell 58, leaves 84 of contact 62 and needle 26 itself are less likely to be damaged from incorrect or misaligned insertion of needle 26. As a result, grounding attachment 30 may be removed from dispenser 12 while dispenser 12 is being filled or when dispensing tip 16 is being replaced so that attachment 30 may be reused. Shell 58 and contact 62 preferably comprise pin receptacles conventionally used in circuit boards and supplied by Mill-Max Manufacturing Corporation, P.O. Box 300, 190 Pine Hollow Road, Oyster Bay, N.Y. 11771-0300.

As best shown by FIG. 3, mounting member 36 is preferably an elongated sleeve 88 having an inner diameter configured for attachment to barrel 14 of dispenser 12 (shown in FIG. 1). Sleeve 88 has an inner diameter sized for at partially surrounding barrel 14 of dispenser 12. Preferably, the inner diameter of sleeve 88 is sized in close tolerance with an outer diameter of barrel 14 so that sleeve 88 remains in place and in contact with barrel 14 unless forcefully removed. In the preferred embodiment, sleeve 88 is C-shaped so that sleeve 88 may be temporarily expanded for removal of sleeve 88 and grounding attachment 30 from dispenser 12. In addition, because sleeve 88 is C-shaped, sleeve 88 allows the operator to visually inspect barrel 14 to detect the amount of epoxy remaining within barrel 14 of dispenser 12. Sleeve 88 is preferably formed from a highly electrically conductive material which is resilient and has a shape memory such as spring stainless steel. When grounding attachment 30 is used in conjunction with glove 40, wrist strap 42 and conductor 44 (manual dispensing), sleeve 88 preferably has a surface area sized and configured for grasping by an operator's hand within glove 40. Alternatively, when grounding attachment 30 is used in conjunction with an automated dispensing process, sleeve 88 may additionally include an electrical connection tab 92 as shown in FIG. 3. Tab 92 integrally projects outward and away from sleeve 88 and permits grounding conductor (not shown) to be easily attached to grounding attachment 30. As can be appreciated, various mechanisms may be used to electrically ground grounding attachment 30.

Figure 6:
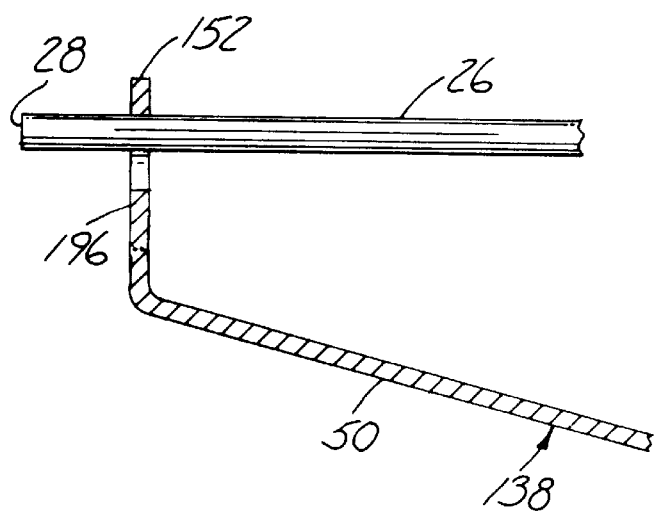
FIG. 6 is a cross-sectional view of the grounding attachment and the receptacle of FIG. 5 with the dispenser partially disposed within the receptacle.

FIGS. 5 and 6 illustrate an alternate embodiment (grounding attachment 130) of grounding attachment 30 shown in FIGS. 2–4. FIG. 5 is an enlarged fragmentary exploded perspective view of needle 26 of dispenser 12 partially extending through and electrically coupled to grounding attachment 130. FIG. 6 is a cross-sectional view of needle 26 inserted through and electrically connected to receptacle 134. For ease of illustration, those elements of FIGS. 5 and 6 which are the same as those elements of FIGS. 2–4 are numbered similarly.

As best shown by FIG. 5, receptacle 34 is replaced with receptacle 134 and conductive arm 38 is replaced with conductive arm 138. Conductive arm 138 is similar to conductive 38 except that receptacle mount 52 is replaced with receptacle mount 152. Similar to receptacle mount 52, receptacle mount 152 extends inward towards an axial center line of needle 26 and dispenser 12. However, as shown by FIG. 5, receptacle mount 152 is integrally formed as part of receptacle 134. Alternatively, the clip of receptacle 134 may be mounted to conductive arm 138. Receptacle mount 152 directly contacts needle 26 of dispenser 12.

Receptacle 134 generally comprises a clip configured for holding needle 26. In the illustrated embodiment, the clip of receptacle 134 is formed by cutting an inverted U-shaped incision or slot 194 to create a finger 196. Slot 194 receives needle 26 of dispenser 12. However, slot 194 is preferably sized so as to have a width on either side of finger 196 less than an outer diameter of needle 26. Slot 194 is preferably formed by an electrical cutting process known as EDM. Finger 196 is preferably formed from a highly electrically conductive resilient material. Finger 196 is preferably formed from the same material as band 50 of conductive arm 138.

As best shown by FIG. 6, because the width of slot 194 on either side of finger 196 is sized smaller than the outer diameter of needle 26, insertion of needle 26 through slot 194 temporarily deflects finger 196 sideways so that finger 196 pivots left or right depending upon how needle 26 is inserted. Because finger 196 is resilient, finger 196 applies a force against the side surface of needle 26 to pressure or clamp needle 26 against receptacle mount 152. Consequently, the clip formed by slot 194 and finger 196 securely holds needle 26 in place and insures a reliable and consistent electrical connection between needle 26 and receptacle 134 of grounding attachment 130. As can be appreciated, the clip formed by receptacle 34, 134 may have a variety of alternate configurations and designs for establishing a reliable, continuous electrical connection between needle 26 and grounding attachment 30, 130 and for securing needle 26 in place.

In conclusion, grounding system 10 provides a reliable, continuous electrical path or circuit from needle 26 of dispenser 12 through grounding attachment 30, 130 and ground connection 32 to AC ground. This electrical pathway has a maximum resistance in series of about $1.0 \times 10^{11}$ ohms. Because the overall resistance in series of the electrical pathway formed by grounding system 10 is within the dissipative range, grounding system 10 effectively drains static charge and minimizes or eliminates voltages existing at needle 26. Preferably, grounding system 10 reduces voltages at needle 26 to levels below allowable voltage levels based upon the sensitivity of the magnetic head to voltage. It has been found that the above disclosed grounding system may reduce voltages to a maximum of about three volts. As a result, grounding system 10 prevents damage to the magnetic head during assembly caused by electrostatic discharges from needle 26 of dispenser 12. At the same time, grounding system 10 does not interfere with the operator's use of dispenser 12 and is extremely ergonomic. In addition, grounding system 10 does not contaminate components of the disc drive assembly being assembled and permits easy determination of the amount of fluids within dispenser 12. As can be appreciated, grounding system 10 may be easily adapted to various other instruments used during assembly of disc drive components which are in electrical contact with the magnetic head.

Although the present invention has been described with reference to preferred embodiments, workers skilled in the art will recognize that changes may be made in form and detail without departing from the spirit and scope of the invention.

What is claimed is:

1. A syringe for assembling a disc drive assembly, wherein the syringe is separated from ground by a supradissipative resistance and wherein the syringe has a needle which is placed in contact with a surface of the assembly in electrical contact with a magnetic head of the assembly, characterized by:

an electrically conductive receptacle engaging and electrically connected to the needle; and electrically conductive means electrically connected between the conductive receptacle and ground for grounding the device to prevent damage to the magnetic head caused by static discharge from the device.

2. The improved device of claim 1 wherein the receptacle includes:

an electrically conductive tube through which the needle is inserted.

3. The improved device of claim 3 wherein the electrically conductive tube includes:

at least one electrically conductive prong within the tube, wherein the prong is resiliently biased into contact with the needle.

4. The improved device of claim 1 wherein the receptacle includes:

a clip configured for holding the needle.

5. The improved device of claim 4 wherein the clip comprises:

a body defining an opening for receiving the needle; and a finger projecting from the body into the opening, wherein the finger clamps the needle against the body.

6. The improved device of claim 1 wherein the syringe includes a tube having a narrowing end through which the needle projects and wherein the electrically conductive means includes:

an electrically conductive mounting member configured for attachment to the tube; and an electrically conductive arm extending from the mounting member to the receptacle.

7. The improved device of claim 6 wherein the electrically conductive mounting member includes:

an electrically conductive sleeve configured for at least partially surrounding the dispenser tube.

8. The improved device of claim 7 wherein the electrically conductive sleeve is substantially C-shaped for partially encircling the dispenser tube.

9. The improved device of claim 6 wherein the electrically conductive arm comprises:

a rigid band fixedly coupled to the mounting member and the receptacle.

10. A fluid dispensing system for dispensing fluids onto a disc drive surface in electrical contact with a magnetic head, the system comprising:

a syringe having a conductive needle through which fluids are dispensed onto the disc drive surface;

an electrically conductive receptacle engaging the needle; and electrically conductive means electrically connected between the conductive receptacle and ground; for electrically grounding the conductive surface to prevent damage to the magnetic head caused by static discharge from the conductive surface.

11. The system of claim 10 wherein the electrically conductive means includes:

an electrically conductive mounting member configured for attachment to an upper portion of the dispenser; and an electrically conductive arm extending from the mounting member to the receptacle.

12. The system of claim 11 wherein the electrically conductive arm includes:

an electrically conductive rigid band fixedly coupled to the mounting member and the receptacle.

13. In a dispenser having a conductive needle through which fluids are dispensed onto a disc drive surface in electrical contact with a magnetic head, an improvement comprising:

an electrically conductive receptacle engaging and electrically connected to the needle; and electrical conductive means electrically connected to the conductive receptacle for electrically grounding the receptacle, to prevent damage to the magnetic head caused by static discharge from the conductive surface.

14. The device of claim 13 wherein the receptacle includes:

an electrically conductive tube through which the needle is inserted.

15. The improved device of claim 14 wherein the electrically conductive tube includes:

at least one electrically conductive prong within the tube, wherein the prong is resiliently biased into contact with the needle.

16. The device of claim 13 wherein the receptacle includes a clip configured for holding the needle.

17. The device of claim 16 wherein the clip includes:

a body defining an opening for receiving the needle; and a finger projecting from the body into the opening, wherein the finger clamps the needle against the body.

18. The device of claim 17 wherein the dispenser comprises a tube having a narrowing end through which the needle projects and wherein the electrical conductive means includes:

an electrically conductive mounting member configured for attachment to the tube; and an electrically conductive arm extending from the mounting member to the receptacle.

19. The device of claim 18 wherein the electrically conductive mounting member includes:

an electrically conductive sleeve configured for at least partially surrounding the dispenser tube.

20. The device of claim 19 wherein the electrically conductive sleeve is substantially C-shaped for partially encircling the dispenser tube.

21. The device of claim 18 wherein the electrical conductive means further includes:

an electrically conductive glove for being placed in electrical contact with the mounting member, wherein the glove is electrically connected to ground.

22. The device of claim 21 wherein the electrical conductive means further includes:

an electrically conductive wrist strap for being worn by an operator adjacent tissue of the operator, wherein the wrist strap is electrically connected to the glove through the operator's tissue; and an electrical conductor extending from the wrist strap to ground.

23. A system for applying fluids onto a surface in electrical contact with a magnetic head, the system comprising:

a syringe having a tube through which fluid is dispensed onto the surface and a barrel for being grasped by an operator;

an electrically conductive attachment coupled to the syringe, the attachment including:

an electrically conductive receptacle engaging and electrically connected to the tube;

an electrically conductive mounting member configured for attachment to the barrel of the syringe; and an electrical conductor extending from the mounting member to the receptacle; and an electrically conductive glove for being worn by the operator and for electrically contacting the electrically conductive mounting member, wherein the electrically conductive glove is grounded.

24. The system of claim 23 further including:

an electrically grounded wrist-strap electrically connected to the electrically conductive glove.

25. The system of claim 24 wherein the electrically conductive attachment, the electrically conductive glove and the electrically grounded wrist strap have a maximum total resistance in series of about $1.0 \times 10^{11}$ ohms.

26. The system of claim 23 wherein the electrically conductive mounting member includes:

an electrically conductive sleeve configured for at least partially surrounding the barrel of the syringe.

27. A method for electrically grounding a hand-held syringe used for assembling a disc drive assembly, wherein the syringe has a needle which is placed in electrical contact with a magnetic head of the disc drive assembly, the method comprising:

mounting an electrically conductive attachment on a surface of the syringe, the attachment having an electrically conductive receptacle in electrical contact with the needle and an electrically conductive means in electrical contact with the conductive receptacle, the conductive means having a configuration for being grasped by the hand of an operator;

wearing an electrically conductive glove over the hand;

wearing an electrically conductive wrist strap, wherein the wrist strap is in contact with the skin of the operator and is electrically grounded; and grasping the electrically conductive means with the electrically conductive glove when the needle is positioned in electrical contact with the magnetic head.

* * * * *